United States Patent
Jang et al.

(10) Patent No.: US 10,904,028 B2
(45) Date of Patent: Jan. 26, 2021

(54) SYSTEM AND METHOD FOR REGISTERING HOME APPLIANCES VIA A GATEWAY USING A PASSWORD GENERATED BASED ON A SERVICE SET IDENTIFIER (SSID) OF THE GATEWAY

(71) Applicant: LG ELECTRONICS INC., Seoul (KR)

(72) Inventors: Bongmun Jang, Seoul (KR); Koonseok Lee, Seoul (KR); Sangjin Park, Seoul (KR); Hyunho Oh, Seoul (KR); Won-Chul Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 16/363,186

(22) Filed: Mar. 25, 2019

(65) Prior Publication Data
US 2019/0296932 A1 Sep. 26, 2019

(30) Foreign Application Priority Data
Mar. 26, 2018 (KR) .................. 10-2018-0034513

(51) Int. Cl.
*H04L 12/28* (2006.01)
*H04L 12/24* (2006.01)
(Continued)

(52) U.S. Cl.
CPC ...... *H04L 12/2814* (2013.01); *H04L 41/0809* (2013.01); *H04L 63/08* (2013.01);
(Continued)

(58) Field of Classification Search
CPC ............. G06F 16/9577; G06F 16/9566; H04L 63/1425; H04L 47/801; G06Q 30/0277
See application file for complete search history.

(56) References Cited

U.S. PATENT DOCUMENTS 8,103,744 B2 * 1/2012 Yoshihara ........... H04L 12/2803
709/219
9,009,805 B1 * 4/2015 Kirkby ................ G06F 3/04855
726/7
(Continued)

FOREIGN PATENT DOCUMENTS

| JP | 2017-046337 | 3/2017 |
| KR | 10-2013-0013238 | 6/2013 |

(Continued)

OTHER PUBLICATIONS

European Search Report dated Jul. 25, 2019 issued in Application No. 19164925.0.

*Primary Examiner* — Daniel C. Murray
(74) *Attorney, Agent, or Firm* — Ked & Associates, LLP (57) ABSTRACT

Disclosed is an automatic registration system for home appliances, which may simplify the process of registering a home appliance using a gateway. The automatic registration system for home appliances includes a home appliance that automatically accesses a gateway using a password that is generated based on an SSID of the gateway; accordingly, the user does not feel that home appliance registration is cumbersome because the user itself does not need to connect a gateway and a home appliance.

20 Claims, 9 Drawing Sheets

(51) Int. Cl.
*H04L 29/06* (2006.01)
*H04L 29/08* (2006.01)

(52) U.S. Cl.
CPC ........ *H04L 63/083* (2013.01); *H04L 63/0876* (2013.01); *H04L 67/125* (2013.01)

(56) References Cited

U.S. PATENT DOCUMENTS

| | | | | |
|---|---|---|---|---|
| 9,054,961 | B1* | 6/2015 | Kim | H04L 41/0806 |
| 9,210,192 | B1* | 12/2015 | Kim | H04L 41/0806 |
| 9,386,445 | B2* | 7/2016 | Koo | H04W 8/22 |
| 9,426,118 | B2* | 8/2016 | Kim | H04W 76/10 |
| 9,426,153 | B2* | 8/2016 | Kim | H04L 41/0806 |
| 9,547,980 | B2* | 1/2017 | Chen | G08C 17/02 |
| 9,647,888 | B2* | 5/2017 | Kim | H04L 47/41 |
| 9,749,146 | B2* | 8/2017 | Lee | H04L 12/2809 |
| 9,794,965 | B1* | 10/2017 | Yu | H04W 12/0804 |
| 9,807,674 | B1* | 10/2017 | Yu | H04W 48/10 |
| 9,820,314 | B2* | 11/2017 | Sidhu | H04W 76/10 |
| 9,998,334 | B1* | 6/2018 | Yu | H04L 63/10 |
| 10,021,145 | B2* | 7/2018 | Lee | H04L 12/2809 |
| 10,027,643 | B2* | 7/2018 | Kim | H04W 12/06 |
| 10,045,389 | B2* | 8/2018 | Kim | H04W 12/06 |
| 10,057,813 | B1* | 8/2018 | Likar | H04W 12/06 |
| 10,064,059 | B1* | 8/2018 | Yu | H04W 48/12 |
| 10,064,062 | B2* | 8/2018 | Idnani | H04W 60/00 |
| 10,122,685 | B2* | 11/2018 | Cheng | H04W 76/10 |
| 10,129,352 | B2* | 11/2018 | Yamada | G06F 16/951 |
| 10,129,746 | B2* | 11/2018 | Lee | G06F 3/04842 |
| 10,178,550 | B2* | 1/2019 | Lee | H04L 63/083 |
| 10,244,397 | B2* | 3/2019 | Idnani | H04W 48/16 |
| 10,419,908 | B1* | 9/2019 | Hutz | H04W 4/50 |
| 10,555,176 | B2* | 2/2020 | Idnani | H04W 12/06 |
| 10,587,429 | B2* | 3/2020 | Kang | H04M 1/72533 |
| 10,598,784 | B2* | 3/2020 | Yang | G01S 17/931 |
| 2012/0008529 | A1* | 1/2012 | Averbuch | H04L 41/0806 370/255 |
| 2012/0331156 | A1* | 12/2012 | Colpitts | H04W 12/0804 709/227 |
| 2013/0041951 | A1* | 2/2013 | Lee | G05B 15/02 709/204 |
| 2014/0073288 | A1* | 3/2014 | Velasco | H04W 12/06 455/411 |
| 2014/0073289 | A1* | 3/2014 | Velasco | H04W 12/04031 455/411 |
| 2014/0121786 | A1* | 5/2014 | Chen | G05B 15/02 700/19 |
| 2014/0129006 | A1* | 5/2014 | Chen | G05B 15/02 700/90 |
| 2014/0165165 | A1* | 6/2014 | Story, Jr. | H04W 12/04031 726/6 |
| 2014/0181916 | A1* | 6/2014 | Koo | H04W 12/08 726/4 |
| 2014/0254577 | A1* | 9/2014 | Wright | H04W 12/04 370/338 |
| 2014/0317242 | A1* | 10/2014 | Koo | H04L 67/1097 709/219 |
| 2015/0089624 | A1* | 3/2015 | Kim | H04L 12/12 726/9 |
| 2015/0097689 | A1* | 4/2015 | Logue | H04L 65/1036 340/632 |
| 2015/0111539 | A1* | 4/2015 | Shim | H04L 12/2803 455/411 |
| 2015/0382198 | A1* | 12/2015 | Kashef | H04W 8/20 726/5 |
| 2016/0073259 | A1* | 3/2016 | Lee | H04L 47/70 715/734 |
| 2016/0087838 | A1* | 3/2016 | Kim | H04L 41/0806 709/224 |
| 2016/0174345 | A1* | 6/2016 | Kelly | H05B 47/105 315/131 |
| 2016/0373270 | A1* | 12/2016 | Yang | H04W 12/08 |
| 2017/0063807 | A1* | 3/2017 | Cheng | H04L 63/083 |
| 2017/0127276 | A1* | 5/2017 | Koo | H04W 12/06 |
| 2017/0234558 | A1* | 8/2017 | Gerszewski | G05B 15/02 700/276 |
| 2017/0234566 | A1* | 8/2017 | Gerszewski | H04W 4/33 700/276 |
| 2017/0289336 | A1* | 10/2017 | Colston | H04W 4/80 |
| 2017/0353859 | A1* | 12/2017 | Idnani | H04W 12/08 |
| 2018/0159855 | A1* | 6/2018 | Ha | G06F 21/35 |
| 2018/0359248 | A1* | 12/2018 | Dwarkaprasad | H04L 63/0876 |
| 2018/0359641 | A1* | 12/2018 | Idnani | H04W 60/00 |
| 2018/0368058 | A1* | 12/2018 | Huang | H04W 48/08 |
| 2019/0052476 | A1* | 2/2019 | Shu | H04W 4/80 |
| 2019/0259374 | A1* | 8/2019 | Kwon | G10L 15/005 |
| 2019/0289116 | A1* | 9/2019 | Colston | H04M 1/72533 |
| 2019/0289117 | A1* | 9/2019 | Colston | H04Q 9/00 |
| 2019/0289118 | A1* | 9/2019 | Colston | H04M 1/72533 |
| 2019/0289468 | A1* | 9/2019 | Idnani | H04W 12/08 |
| 2020/0153650 | A1* | 5/2020 | Yang | G01S 17/931 |

FOREIGN PATENT DOCUMENTS

| | | |
|---|---|---|
| KR | 10-2014-0054970 | 5/2014 |
| KR | 10-1555678 | 9/2015 |

* cited by examiner

SYSTEM AND METHOD FOR REGISTERING HOME APPLIANCES VIA A GATEWAY USING A PASSWORD GENERATED BASED ON A SERVICE SET IDENTIFIER (SSID) OF THE GATEWAY

CROSS-REFERENCE TO RELATED APPLICATION

This application claims priority under 35 U.S.C. § 119 to Korean Application No. 10-2018-0034513, filed on Mar. 26, 2018, whose entire disclosure is hereby incorporated by reference.

BACKGROUND

1. Field of the Invention

The present disclosure relates to an automatic registration system for home appliances, which can simplify the process of registering home appliances.

2. Description of Related Art

In general, a gateway is a device that can allow different types of networks to communicate with each other using different communication networks or different protocols in a network. Simply put, a gateway is a device, one side of which forms a local network and the other side of which forms a network with a server or an external device.

When a gateway and an external device are connected with each other, a channel may be formed, and data may be exchanged only after authentication between the gateway and the external device.

In this case, when connecting with the external device, the gateway may be connected with the external device after mutual authentication through a security module in the gateway to prevent unauthorized access to itself from the outside.

The user feels that authentication is cumbersome because the user itself has to input a password in the process where the gateway is paired with the external device through a security module such as a wireless access point (WAP), extensible authentication protocol (EAP), and the like.

In Korean Patent No. 10-1518489, a conventional method for automatically connecting a gateway and an external device is disclosed. With reference to this, a conventional method for automatically connecting a gateway and an external device will be described.

Figure 1:
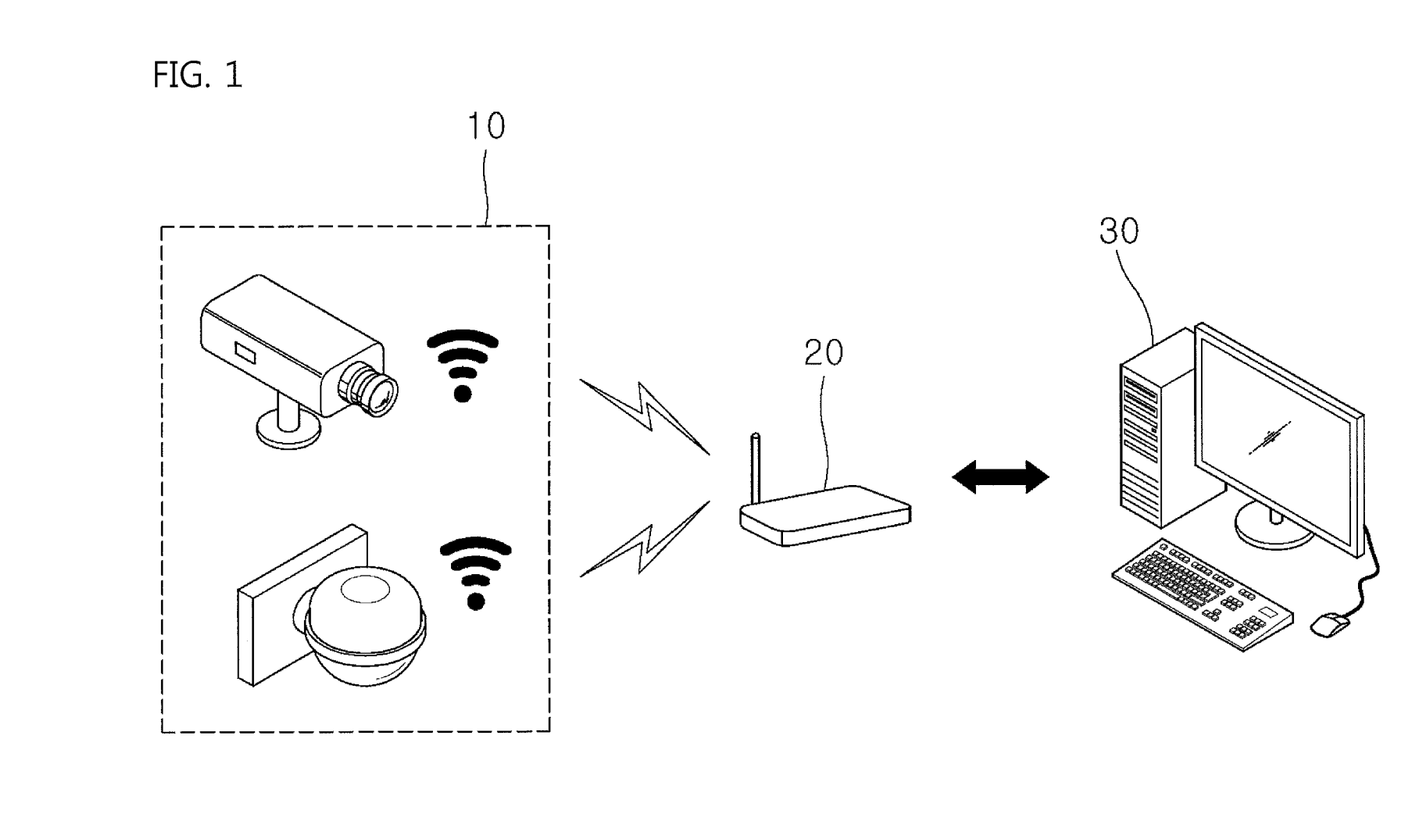
FIGS. 1 and 2 are views of a conventional method for automatically connecting an external device.
Figure 2:
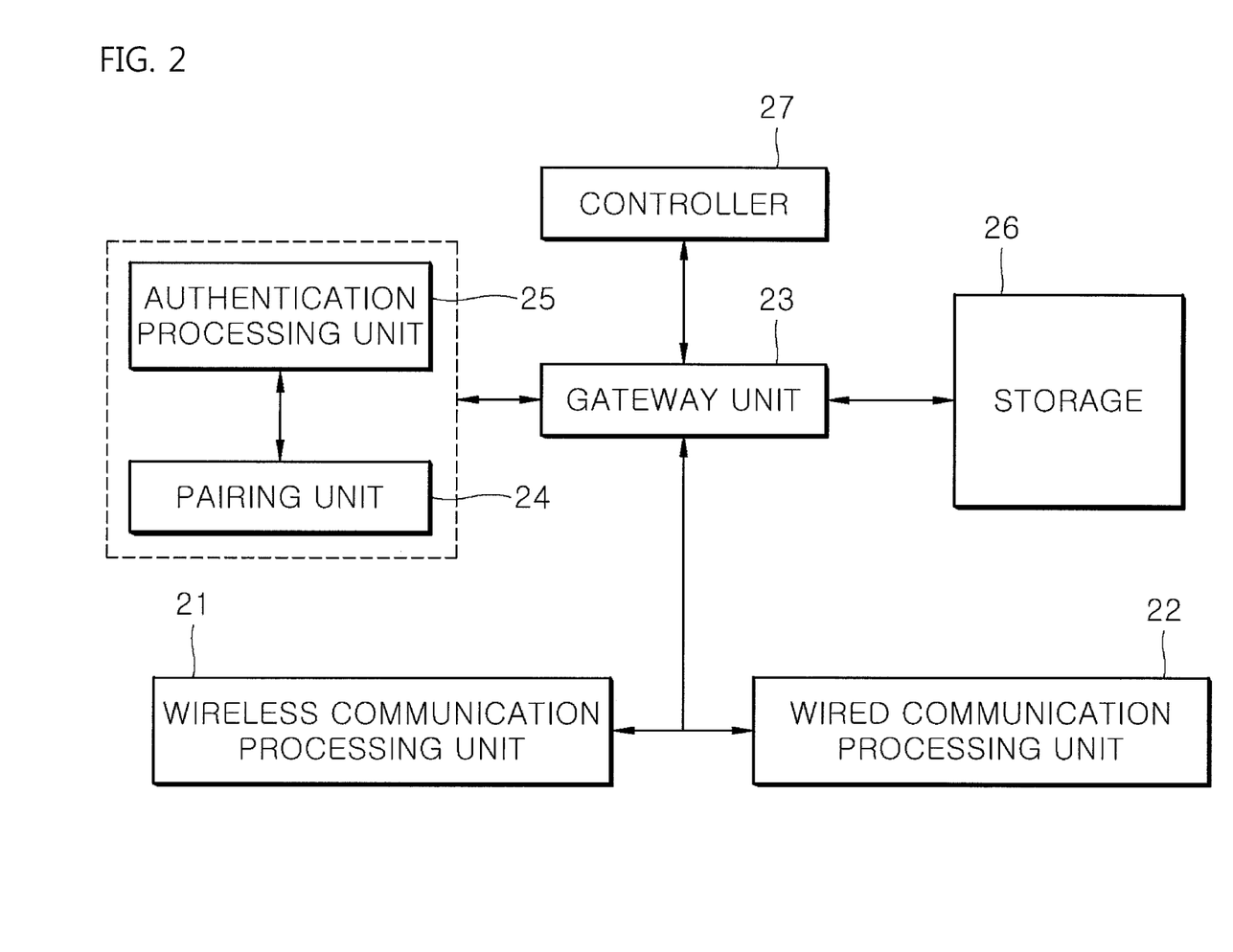

FIGS. 1 and 2 are views of a conventional method for automatically connecting an external device. Reference numerals in FIGS. 1 and 2 are used only to describe FIGS. 1 and 2.

Referring to FIGS. 1 and 2, a conventional automatic connection system for external devices includes a plurality of Wi-Fi Direct devices 10 into which a Wi-Fi module is built, a gateway 20 that forms a Wi-Fi network and the Wi-Fi Direct device 10, and a management server 30 that accesses the gateway 20 and controls the Wi-Fi Direct device 10.

In general, a Wi-Fi Direct device 10 is a device into which a Wi-Fi module is built and which may allow devices into which a Wi-Fi module is built to directly exchange data without an access point (AP).

In the state where an authentication code is created by combining two of a media access control address(MAC address) and a service set identifier (SSID) of the Wi-Fi Direct device 10 and combining the result with a public key that is defined at the time when a product is manufactured, the authentication code is encoded using a security module such as a WAP, EAP.

Accordingly, the gateway 20 decodes the authentication code that is transmitted from the Wi-Fi Direct device 10, performs a reverse-process to separate the same into a personal key that is provided by a manufacturer and the MAC address and SSID of the Wi-Fi Direct device 10, and searches the MAC address and SSID of the Wi-Fi Direct device 10 that requests access so as to automatically authenticate the two values at the time the Wi-Fi Direct device 10 and the gateway 20 are paired.

Specifically, the gateway 20, as in FIG. 2, includes a gateway unit 23, a controller 27, an authentication processing unit 25, a pairing unit 24, wired/wireless communication processing unit 21, 22 and a storing unit 26.

The gateway 20 forms two or more networks through the wired/wireless communication processing unit 21, 22. One side of the gateway 20 connects with the Wi-Fi Direct device 10 and the other side of the gateway 20 connects with the management server 30.

However, the conventional automatic connection method for external devices may be used only for a Wi-Fi Direct device and may not be widely used for external devices to which different types of communication methods are applied.

Recently, smart home appliances need to be registered with a user account through a cloud system to support IoT functions such as a remote control.

However, the conventional automatic connection method for external devices discloses only a method for automatically connecting an external device to a Wi-Fi network. Accordingly, the user itself needs to register a new smart home appliance with the user account to control the home appliance remotely. This makes the user feel the home appliance registration is cumbersome.

Additionally, the user itself needs to select the home appliance from a list and input a password that corresponds to an access point (AP) to register the new smart home appliance with the user account.

Further, the conventional automatic connection method for external devices has a problem that a home appliance may automatically connect to an access point of a neighboring house, which uses a gateway in the same way as that of the access point of the user's house.

SUMMARY

The present disclosure provides an automatic registration system for home appliances, which may automatically connect a home appliance to a gateway without authentication which requires separate password input.

The present disclosure provides an automatic registration system for home appliances, which may automatically register an unregistered home appliance that has accessed a gateway with a user account.

The present disclosure provides an automatic registration system for home appliances, which may deliver authentication information on a specific gateway to a home appliance that is activated by the user, thereby making it possible to prevent the home appliance from connecting to another gateway.

Objectives of the present disclosure are not limited to what has been described. Additionally, other objectives and advantages of the disclosure, which have not been mentioned, will be understood from the following description and will be better understood with reference to implementations. Further, it will be understood that the objectives and advantages of the disclosure may be realized through means in the appended claims and a combination thereof.

According to an implementation, an automatic registration system for home appliances includes a home appliance that may automatically access a gateway using a password that is generated based on an SSID of the gateway. Thus, the user itself does not need to connect the home appliance and the gateway.

According to an implementation, an automatic registration system for home appliances includes a user terminal that may receive information on an appliance, which is needed to register the appliance with a user account, and that may automatically register the appliance with the user account. Thus, the user itself does not need to register the appliance with a user account.

According to an implementation, an automatic registration system for home a ppliances includes a home appliance that may receive an SSID and a password of a gateway that forms an access point and a local network and that may automatically access the gateway, thereby preventing the home appliance from connecting to another gateway.

The automatic registration system for home appliances may automatically connect a home appliance with a gateway without authentication in which the user needs to input a password. Thus, the user itself does not need to configure the home appliance with a gateway to connect the home appliance to the internet.

Additionally, the automatic registration system for home appliances may register with a user account a home appliance that accesses a gateway but is not registered with the user account. In this case, a user terminal may receive information on the home appliance through the gateway and may register the home appliance with the user account using the received information. Thus, the user itself does not need to register the home appliance with the user account, and convenience of the user may improve when the user uses the home appliance.

Additionally, the automatic registration system for home appliances may deliver authentication information of a gateway that connects to a local network to a home appliance that is activated by the user and may prevent the home appliance from connecting to the other's gateway. Thus, the automatic registration system for home appliances may solve the problem that a home appliance automatically connects to an access point of a neighboring house, which uses the same sort of gateway as that of the access point of the user's house. Further, security and safety related to use of home appliances may be ensured, the risk of personal information leakage may be reduced, and satisfaction of the user may improve.

Specific effects of the present disclosure including the above-described effects will be described in the detailed description of the present disclosure.

DETAILED DESCRIPTION

Terms and words used in this specification and the appended claims should not be interpreted as those defined in commonly used dictionaries. Accordingly, the terms and words should be interpreted on the basis of the meaning and concept in accordance with the technical spirit of the present disclosure according to the principle that the inventor can properly define the concept of terms so as to best describe the present disclosure. Further, the implementations set forth in this specification and the elements illustrated in the drawings will be presented only as preferred implementations and do not represent all the technical spirit of the present disclosure. Accordingly, it should be understood that various equivalents and modifications replaceable with the implementations and elements can exist at the time when this application is filed.

An automatic registration system for home appliances according to implementations of the present disclosure will be described with reference to FIGS. 3 to 9.

Figure 3:
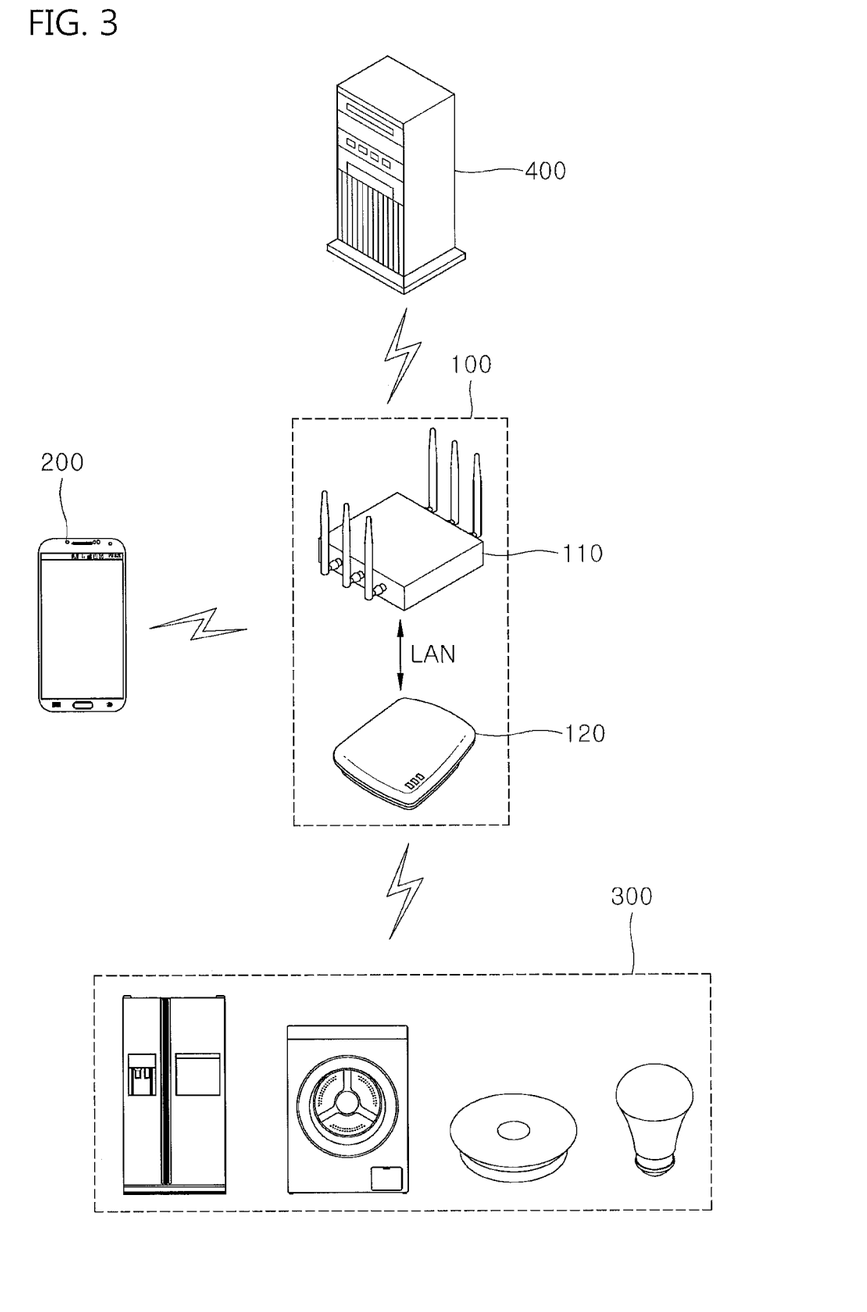
FIG. 3 is a block diagram showing an automatic registration system for home appliances according to implementations of the present disclosure.
Figure 4:
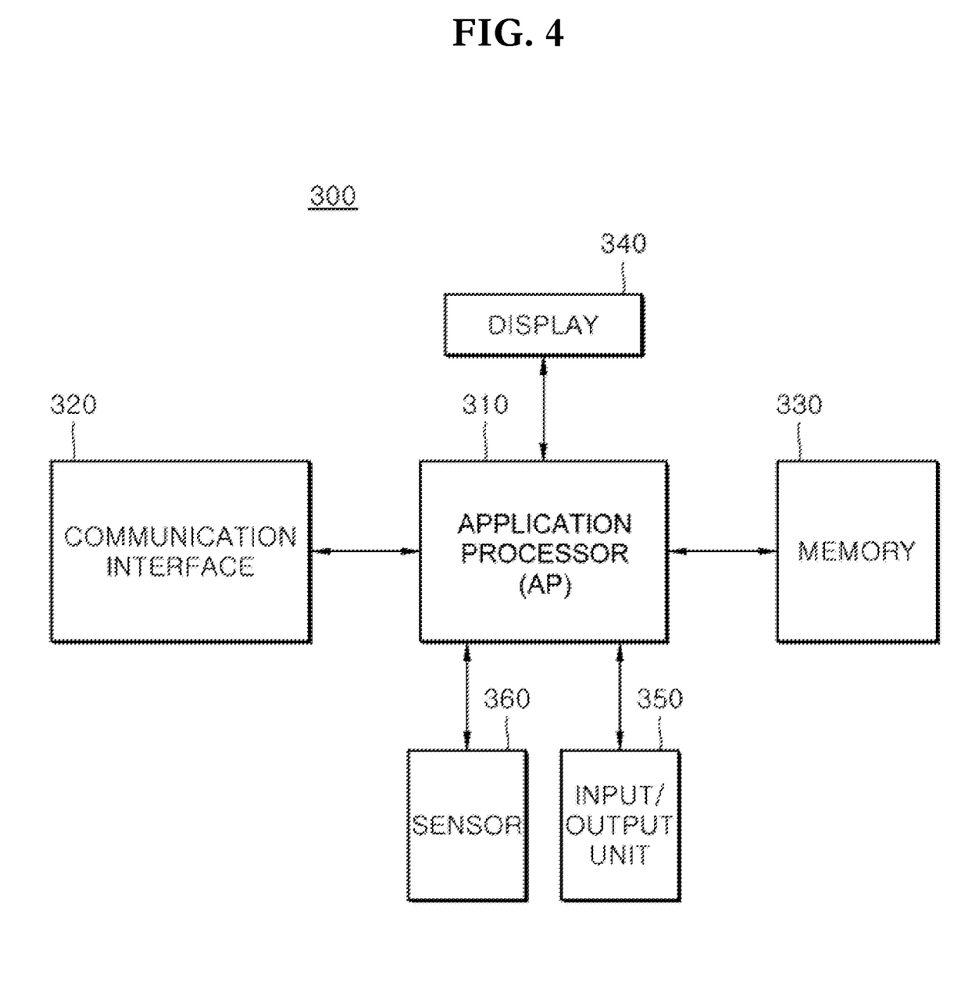
FIG. 4 is a block diagram showing elements of the home appliances in FIG. 3.

FIG. 3 is a block diagram showing an automatic registration system for home appliances according to implementations of the present disclosure, and FIG. 4 is a block diagram showing elements of the home appliances in FIG. 3.

Referring to FIGS. 3 and 4, an automatic registration system for home appliances according to implementations of the present disclosure includes an access point (AP) 110, a gateway 120, a user terminal 200, a home appliance 300 and a cloud sever 400.

The access point 110 forms a local network 100 with a gateway 120 and connects with a cloud server 400 and an external communication network (e.g., the Internet network or the public communications network). That is, the access point 110 serves as a medium for connecting the Internet network and a local network.

The access point 110 has a unique service set ID (hereinafter referred to as "SSID"). In general, the access point 110 exchanges date only after mutual authentication through a security module so as to prevent access by users without authority from the outside.

In this case, Wireless Equivalent Privacy (WEP) in compliance with the IEEE 802.11 standard for wireless LAN, or Wi-Fi Protected Access (WPA)/Wi-Fi Protected Access 2 (WPA2) that are a complement to WEP in compliance with the IEEE 802.11i standard may be used for the security module. According to implementations, a variety of methods may be optionally selected.

Accordingly, the access point 110 requires a password (hereinafter referred to as "PW") during a pairing process through the security module such as WAP, EAP, and the like and, in this case, may be paired with an device and exchange data with the device at the time when mutual authentication proceeds based on the input PW.

The gateway 120 may make a wired connection with the access point 110. For instance, the gateway 120 may connect with the access point 110 using a local area network (LAN).

In this case, the gateway 120 may be paired with the access point 110 without a service set identifier (SSID) of the access point 110 and an input PW and may access an external communication network (e.g., the Internet network or the public communications network) through the access point 110.

Like the access point 110, the gateway 120 has a unique SSID and PW and may wirelessly connect with an external device (e.g., a user terminal 200 or a home appliance 300) through the security module.

The SSID of the gateway 120 consists of a prefix that is commonly given to the same sort of gateways and a suffix that represents a unique value of each appliance.

In this case, the prefix is used to identify the sort of the gateway 120. Accordingly, a user terminal 200 or a home appliance 300 may search the gateway 120 in a local network using the prefix.

The suffix may be generated by encoding the PW of the gateway 120. In this case, the PW of the gateway 120 has a unique value. Thus, a suffix of each product has a unique value because the suffix is generated based on a unique PW.

A decoding algorithm may be stored in a user terminal 200 or a home appliance 300, in advance, to decode an encoded password of the gateway. Accordingly, the user terminal 200 or the home appliance 300 may generate a PW of a gateway 120 using the suffix of the gateway 120.

The generated SSID and PW allow the user terminal 200 or the home appliance to access the gateway 120. Hereunder, this will be described specifically.

The gateway 120 may change a protocol such that the access point 110 accesses an external communication network (e.g., the Internet network or the public communications network). External devices that have accessed the gateway 120 may be connected to an external communication network via the gateway 120.

In some cases, the gateway 120 may be integrated into the access point 110. In other cases, the access point 110 may perform functions of a first gateway, and the gateway 120 may perform functions of a second gateway.

Additionally, the gateway 120 may be among the Internet of Things (IoT) devices. For instance, a specific terminal may be an IoT device and, at the same time, may be a gateway 120 that connects to another IoT device. In this case, the specific terminal may connect to a mobile communication network.

The user terminal 200 wirelessly connects to the access point 110 or the gateway 120. The user terminal 200 may access a cloud server 400 through a wireless communication network and may use cloud services by logging in to the user account.

The cloud services refer to a service that is provided to users who have their own accounts such that the users store data in relation to them in their own accounts and share and use the data.

For instance, the user may log in to the user account through the cloud server 400, download a file that was uploaded before by the user, receive information on an appliance that is registered with the user account in real time, or control the registered appliance remotely. However, what has been described is only an example. A variety of cloud services may be provided on the basis of the user account.

The user terminal 200 may log in to the user account through the cloud sever 400 and then register a home appliance 300 regarding the user terminal with the user account. By doing so, the user terminal 200 may receive information on the state of the home appliance 300 in real time and remotely control the home appliance 300 through the cloud server 400.

Various applications that are needed to use cloud services may be installed on the user terminal 200, and the user may use the cloud services through the applications on the user terminal 200.

The user terminal 200 may include any computer system such as a mobile phone, a smart phone, a personal digital assistance (PDA), a desktop, a laptop, a tablet, and the like.

The home appliance 300 connects to the gateway 120 using a wireless communication network. The home appliance 300 transmits information on the state of the home appliance 300 through the gateway 120, receives a control instruction through the gateway 120 and operates.

FIG. 4 shows elements of a home appliance. Referring to FIG. 4, the home appliance 300 includes a communication interface 320 so as to communicate with the outside The communication interface 320, for instance, may include a wired communication interface for a local area network (LAN), a short-range wireless communication interface like Bluetooth, Wireless Fidelity (Wi-Fi), and Zigbee, and a modem communication interface that is accessible to a mobile cellular network such as power Line communication (PLC) or 3rd Generation (3G), Long Term Evolution (LTE), and the like.

The communication interface 320 may include a transceiver and/or receiver. The home appliance 300 may transmit and/or receive information from the access point 110 or the gateway 120 through the transceiver and/or the receiver. Additionally, the home appliance 300 may communicate with the user terminal 200 or another IoT device to transmit and/or receive information on control of the home appliance 300 or data.

The home appliance 300 may further include a processor or an application processor 310, and the like that computes. The home appliance 300 may further include a battery is built for inner power supply or a power supplier for receiving power from the outside.

Additionally, the home appliance 300 may include a display 340 that shows information on the inner state of the home appliance or data. The user may control the home appliance 300 through a user interface (UI) of the display 340 of the home appliance 300. The home appliance 300 may transmit information on the inner state of the home appliance and/or data to the outside through the transceiver and receive a control instruction and/or data from the outside through the receiver.

A memory 330 may store a control instruction code, control data or user data, and the control instruction code or the control data is need for controlling a home appliance 300. Additionally, the memory 330 may store a decoding algorithm for extracting a PW from the SSID of the gateway 120.

The memory 330 may include at least one of volatile memory or non-volatile memory. The non-volatile memory includes read-only memory (ROM), programmable read-only memory (PROM), electrically programmable read-only memory (EPROM), electrically erasable and programmable read-only memory (EEPROM), flash memory, phase-change random access memory (PRAM), magnetic random access memory (MRAM), resistive random access memory (RRAM), ferroelectric random access memory (FRAM), and the like. The volatile memory may include at least one of various memories such as dynamic random access memory (DRAM), static random access memory (SRAM), synchronous dynamic random access memory (SDRAM), phase-change random access memory (PRAM), magnetic random access memory (MRAM), resistive random access memory (RRAM), ferroelectric random access memory (FeRAM), and the like.

The home appliance 300 may further include a storage device. The storage device may be a non-volatile medium such as a hard disk drive (HDD), a solid-state disk (SSD), an embedded multimedia card (eMMC), and a universal flash storage (UFS). The storage device may store user information that is provided through an input/output part 350, and sensing information that is collected through a sensor 360.

The home appliance 300 may include a washer, a refrigerator, a TV, a microwave oven, an electric bulb, and the like that are used by the user in daily life.

That is, the home appliance 300 may communicate with the gateway 120 through the communication interface 320, transmit information on its state and operate based on an instruction that is received from an external device.

Referring to FIG. 3 again, the cloud server 400 is a device that is connected to an external communication network (e.g., the Internet network or the public communications network) which provides cloud services.

The cloud server 400 stores and manages accounts of a plurality of users.

In this case, information on a user, a user terminal (200), a home appliance 300 that is registered by the user in advance is stored in a user account.

The user may log in to the user account of the cloud server 400 using the user terminal 200, receive information on the current state of the home appliance 300 that is registered with the user account in advance or control the home appliance that is registered in advance remotely. However, what has been described is provided only as an example. The cloud server 400 provides various cloud service. Accordingly, a variety of cloud services may be used.

The user needs to register the home appliance 300 with the user account to use the cloud services.

Conventionally, the user itself has to carry out steps to register a new home appliance 300 with the user account.

Specifically, authentication has to be performed such that the user connects a home appliance 300 with a gateway 120, and the home appliance 300 connected to the gateway 120 has to be registered with the user account again. The user itself has to carry out these steps.

An automatic registration method for home appliances according to the present disclosure includes automatically connecting a home appliance 300 to a gateway 120 and automatically registering the home appliance with a user account. The automatic registration method for home appliances will be described below.

Figure 5:
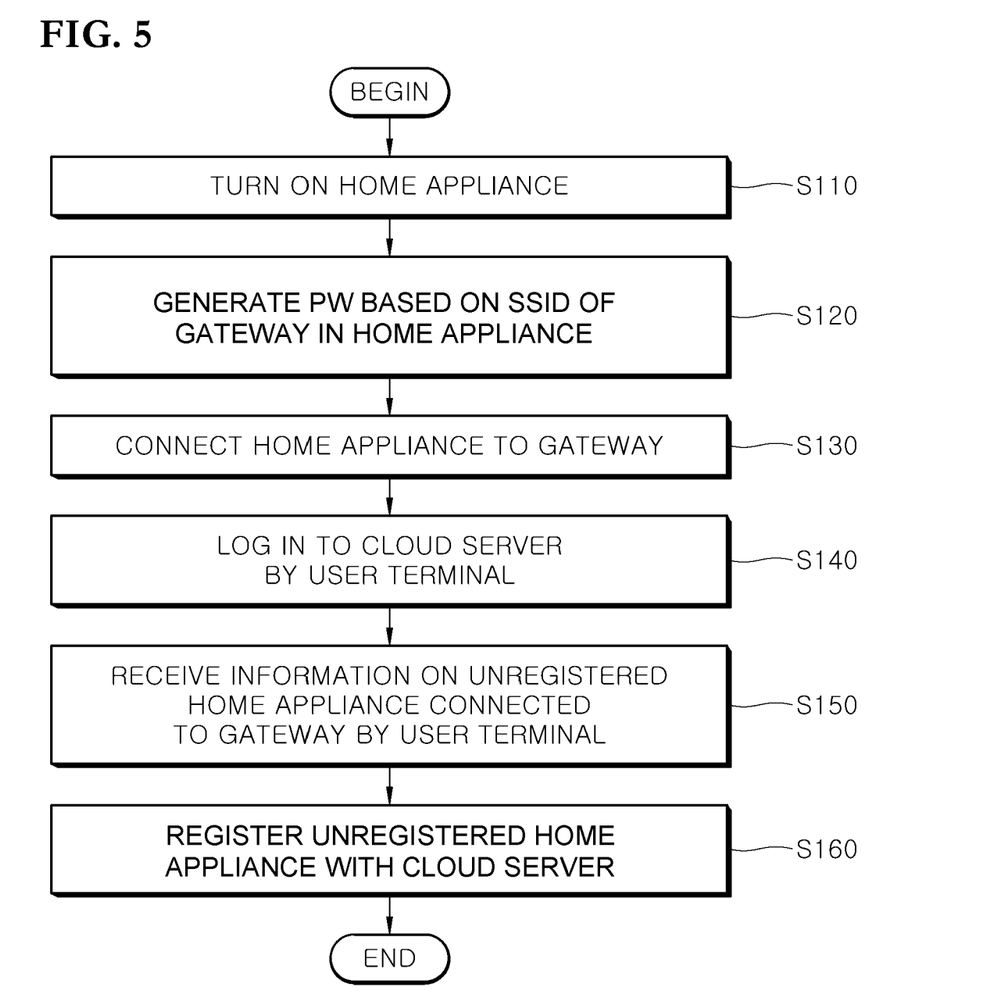
FIGS. 5 and 6 are flow charts showing an automatic registration method for home appliances according to an implementation of the present disclosure.
Figure 6:
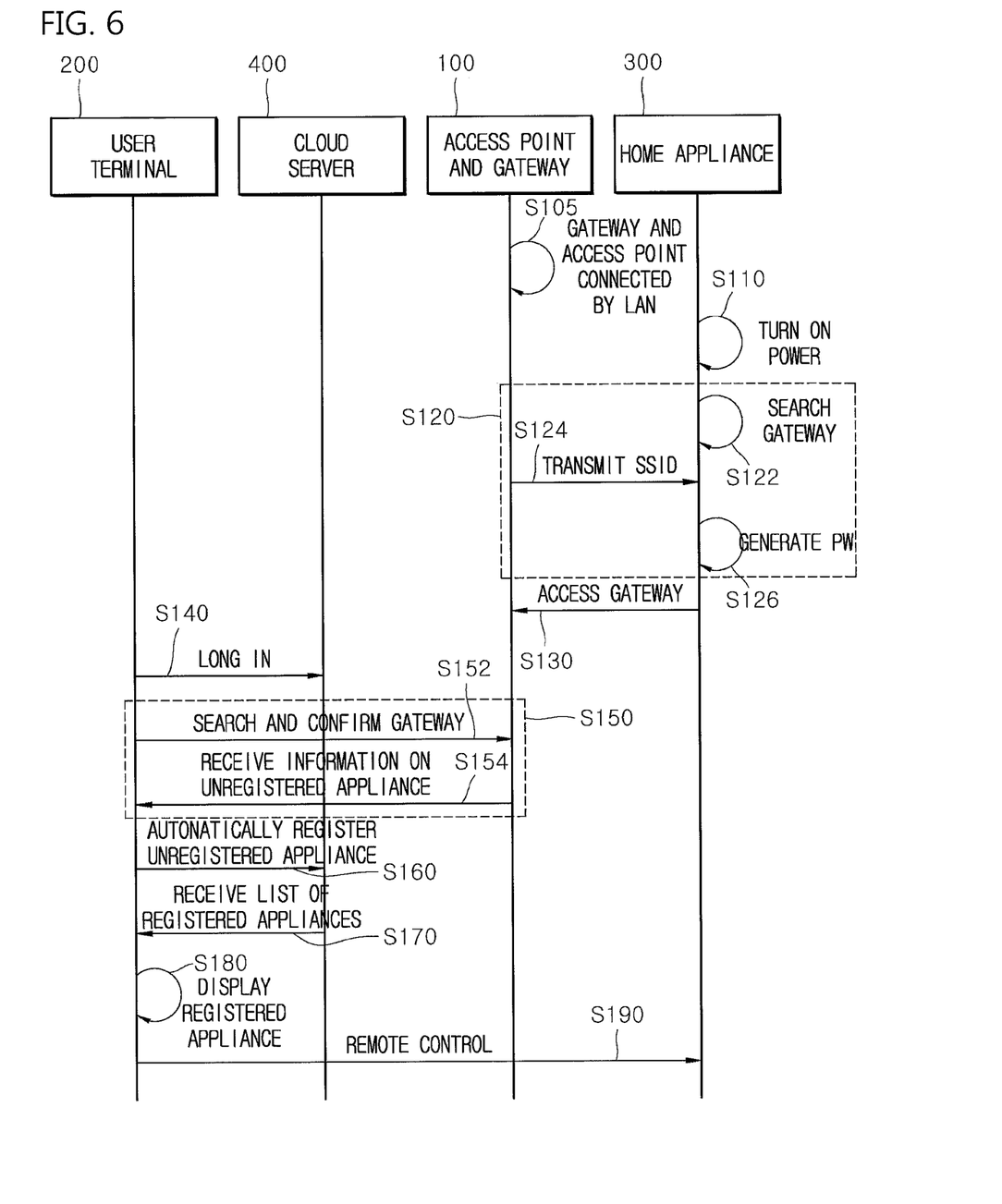

FIGS. 5 and 6 are flow charts showing an automatic registration method for home appliances according to an implementation of the present disclosure.

Referring to FIGS. 5 and 6, in the automatic registration method for home appliances according to an implementation of the present disclosure, the access point 110 makes a wired connection with the gateway 120 (S105).

A home appliance that connects to the gateway 120 may use the wireless communication network of the access point 110 as the gateway 120 makes a wired connection with the access point 110.

In this case, authentication needed to access the access point 110 may be omitted because the home appliance 300 may use the wireless communication network through the gateway 120.

Next, the user turns on the home appliance 300 that will be registered with the user account (S110).

Next, the home appliance 300 generates a PW based on an SSID of the gateway 120 (S120).

The SSID of the gateway 120 consists of a prefix that is commonly given to the same sort of gateways and a suffix that represents a unique value of each appliance.

In this case, the prefix is used to identify the sort of the gateway 120. Accordingly, the user terminal 200 or the home appliance 300 may search the gateway 120 in a local network using the prefix.

The suffix may be generated by encoding the PW of the gateway 120. In this case, the PW of the gateway 120 has a unique value. Thus, a suffix of each product has a unique value because the suffix is generated based on a unique PW.

Specifically, the home appliance 300 searches the gateway 120 using a short-range wireless communication network (e.g., Wi-Fi) (S122).

Next, the home appliance 300 receives the SSID from the searched gateway 120 (S124).

Next, the home appliance 300 generates a PW of the gateway 120 on the basis of the received SSID (S126).

For instance, when the SSID of the gateway 120 is "LG_GW2.0_E824EA234", the prefix is "LG_GW2.0", and the suffix is "E824EA234". In this case, the home appliance 300 determines the sort of the gateway 120 based on "LG_GW2.0" and selects a decoding algorithm that corresponds to the gateway 120 from the algorithm that is stored in the memory for generating a PW.

Next, the home appliance 300 calculates a PW using the decoding algorithm that is selected on the basis of "E824EA234".

Next, the home appliance 300 accesses the gateway 120 using the SSID of the searched gateway 120 and the generated PW (S130). In this case, the home appliance 300 may access the wireless communication network through the access point 110 while not registered with the user account of the cloud server 400.

Next, the user logs in to the user account of the cloud server 400 through the user terminal 200 (S140).

Next, the user terminal 200 receives information on the home appliance 300 that has already accessed the gateway 120 but has not yet been registered (S150).

Specifically, the user terminal 200 searches the gateway 120 (S152).

Next, when the user terminal 200 confirms the gateway 120, the user terminal 200 receives information on the home appliance 300 that has not yet been registered with the user account among appliances that have accessed the confirmed gateway 120 (S154).

In this case, the user terminal 200 receives information on the home appliance 300 that has accessed the gateway 120 and determines whether the home appliance 300 that has accessed the gateway 120 is the one that is registered with the user account.

Next, the user terminal 200 receives from the gateway 120 information needed to register the home appliance 300 that is not registered with the user account with the user account.

Though not explicitly illustrated in the drawings, the user terminal 200, in this case, may display on a screen a message that asks "Would you register an unregistered appliance?".

Next, with information on an unregistered home appliance 300 (or information on a product), the user terminal 200 automatically registers the home appliance 300 with the user account through the cloud server 400 (S160).

Next, the user terminal 200 receives a list of appliances that are registered with the user account from the cloud server 400 (S170).

Next, the user terminal 200 displays information on an appliance that is registered with the user account through an application (S180).

Next, the user terminal 200 may receive information on a state of the appliance that is registered with the user account through an application or may control the appliance remotely (S190).

By doing so, in the automatic registration method for home appliances according to an implementation of the present disclosure, a home appliance 300 may automatically access the gateway 120 without authentication. And, a home appliance that has accessed the gateway 120 but is not registered with the user account may be automatically registered with the user account. According to the present disclosure, the user itself does not need to register a home appliance with the user account. Thus, the present disclosure may ease the burden of registering a home appliance with the user account and provide convenience to the user when the home appliance is used.

However, with the above-described automatic registration method for home appliances, there might be a problem that a home appliance automatically connects to an access point of a neighboring house, which uses same sort of gateway as that of the access point of the user's house.

Below, an automatic registration method for home appliances according to another implementation of the present disclosure will be described as a means to solve the above-described problem.

Figure 7:
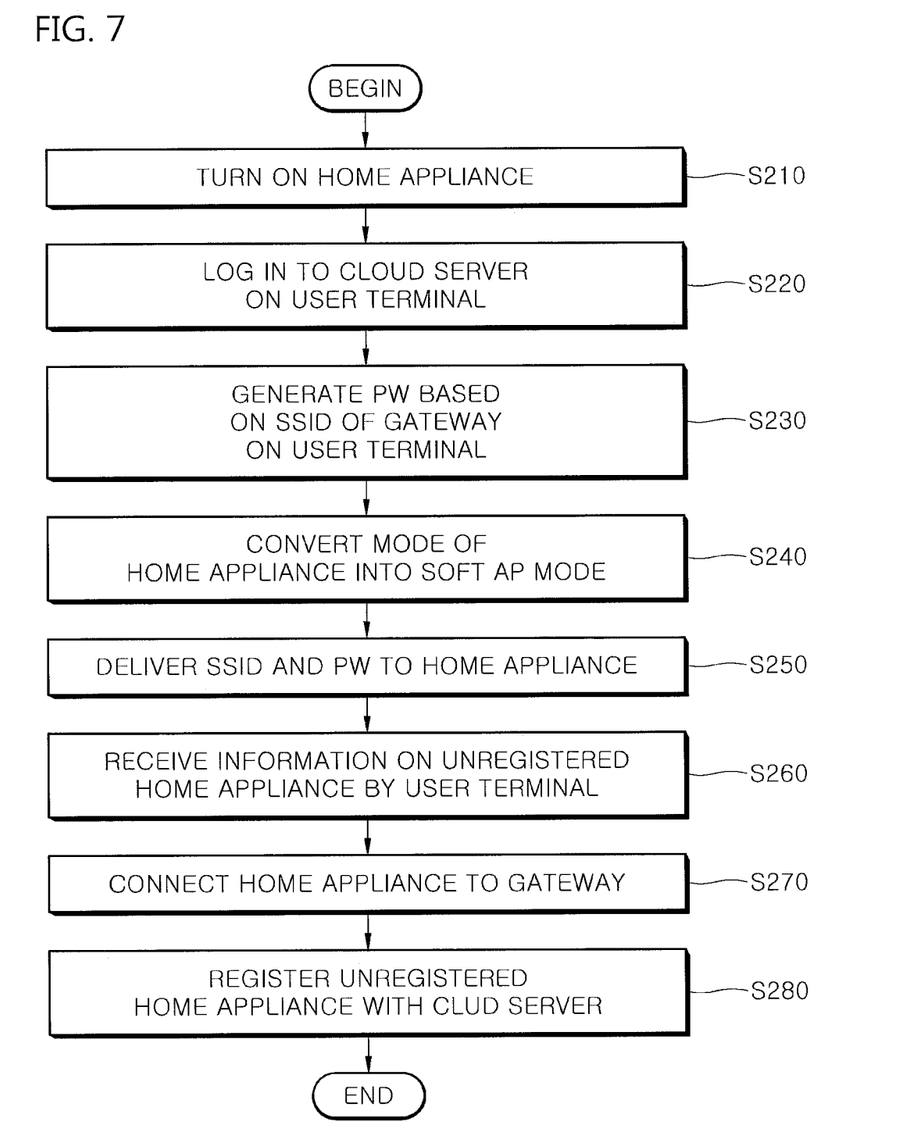
FIGS. 7 and 8 are flow charts showing an automatic registration method for home appliances according to another implementation of the present disclosure.
Figure 8:
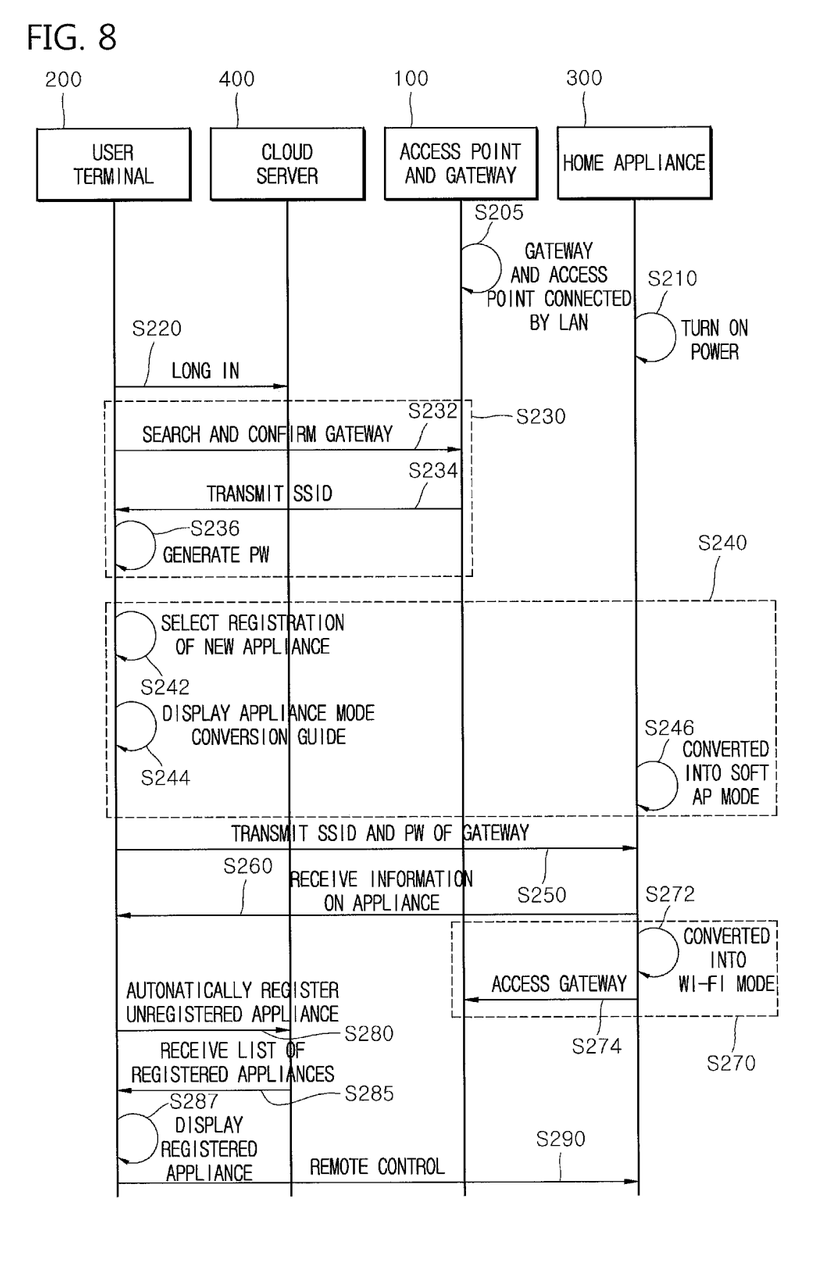

FIGS. 7 and 8 are flow charts showing an automatic registration method for home appliances according to another implementation of the present disclosure. Hereunder, differences between the automatic registration method for home appliances in FIGS. 5 and 6, and the automatic registration method for home appliances in FIGS. 7 and 8 will be described.

Referring to FIGS. 7 and 8, in the automatic registration method for home appliances according to another implementation of the present disclosure, the access point 110 make a wired connection with the gateway 120 (S205). A home appliance that has accessed the gateway 120 may use the wireless communication network of the access point 110 as the gateway 120 makes a wired connection with the access point 110.

Next, the user turns on the home appliance 300 that will be registered with the user account (S210).

Next, the user logs in to the user account of the cloud server 400 through the user terminal 200 (S220).

Next, the user terminal 200 generates a PW on the basis of an SSID of the gateway 120 (S230).

Specifically, the user terminal 200 searches the gateway 120 that connects to the access point 110 (S232). In this case, the user terminal 200 of the access point 110 may be in a state where the user terminal is connected to a local network of the access point 110 through a short-range wireless communication network (e.g., Wi-Fi). However, the present disclosure is not limited to what has been described.

Next, the user terminal 200 receives the SSID from the searched gateway 120 (S234).

Next, the user terminal 200 generates a PW of the gateway 120 based on the received SSID (S236). In this case, the user terminal 200 may include a memory that has already stored a decoding algorithm used to generates a PW.

For instance, when the SSID of the gateway 120 is "LG_GW2.0_E824EA234", a prefix is "LG_GW2.0", and a suffix is "E824EA234".

In this case, the user terminal 200 determines the sort of the gateway 120 based on "LG_GW2.0" and selects a decoding algorithm that corresponds to the gateway 120 from the algorithm that is stored in the memory in advance to decode the PW.

Next, the user terminal 200 calculates a PW using the decoding algorithm that is selected on the basis of "E824EA234" which is a suffix. The generated SSID of the gateway 120 and the generated PW are stored in the memory.

For instance, the user selects "registration of a new home appliance" through an interface that is provided by an application of the user terminal 200 (S242).

Next, the user terminal 200 displays on a screen a "mode conversion guide" of a home appliance 300 that is selected by the user (S244).

Next, the user converts operation mode of the home appliance 300 into "Soft-AP mode" with reference to the "mode conversion guide" (S246).

By doing so, the user may convert the mode of the home appliance 300 into "Soft-AP mode" (S240).

Next, the user terminal 200 delivers the SSID of the gateway 120 and the PW to the home appliance 300 in "Soft-AP mode" (S250). In this case, the user terminal 200 may search an appliance that operates in "Soft-AP mode" and deliver to the searched appliance the SSID of the gateway 120 and the PW that have already been calculated.

Next, the user terminal 200 receives from the home appliance 300 information on the appliance, which is needed to register the home appliance 300 with the user account (S260).

Next, the home appliance 300 accesses the gateway 120 using the received SSID and PW (S270).

To this end, the mode of the home appliance 300 is converted from "Soft-AP mode" to short-range wireless communication network mode (e.g., Wi-Fi mode) (S272). The mode of the home appliance 300 may be automatically converted.

Next, the home appliance 300 accesses the gateway 120 that connects to the access point 110 using the SSID and PW received from the user terminal 200 (S274).

The home appliance 300 searches the gateway 120 that forms a local network with the access point 110 and accesses the gate way 120 that corresponds to the received SSID and PW. In this case, the home appliance 300 may access a wireless communication network through the access point 110 but has not yet been registered with the user account of the cloud server 400.

Next, the user terminal 200 registers an unregistered home appliance 300 with the user account through the cloud server 400 (S280).

Specifically, the user terminal 200 receives information on the home appliances 300 that have accessed the gateway 120 and determines whether the home appliances 300 that have accessed the gateway 120 are the ones that have already been registered with the user account.

Next, though not explicitly illustrated in the drawings, the user terminal 200 may display on a screen a message that asks "If you register an unregistered appliance".

Next, with information on an unregistered home appliance 300 (or information on a product), the user terminal 200 automatically registers the home appliance 300 with the user account through the cloud server 400.

Next, the user terminal 200 receives a list of appliances that are registered with the user account from the cloud server 400 (S285).

Next, the user terminal 200 displays information on an appliance that is registered with the user account through an application (S287).

Next, the user terminal 200 may receive information on a state of the appliance that is registered with the user account through an application or may control the appliance remotely (S290).

By doing so, with the automatic registration method for home appliances according to another implementation of the present disclosure, authentication information on a specific gateway is delivered to a home appliance that is activated by the user so as to prevent the home appliance from connecting to gateways of other people.

Thus, according to the above-described automatic registration method for home appliances, a home appliance may not automatically connect to an access point of a neighboring house, which uses the same sort of gateway as that of the access point of the user's house. Accordingly, security and safety related to use of home appliances may be ensured. Further, the risk of personal information leakage may be reduced, and satisfaction of the user may improve.

Figure 9:
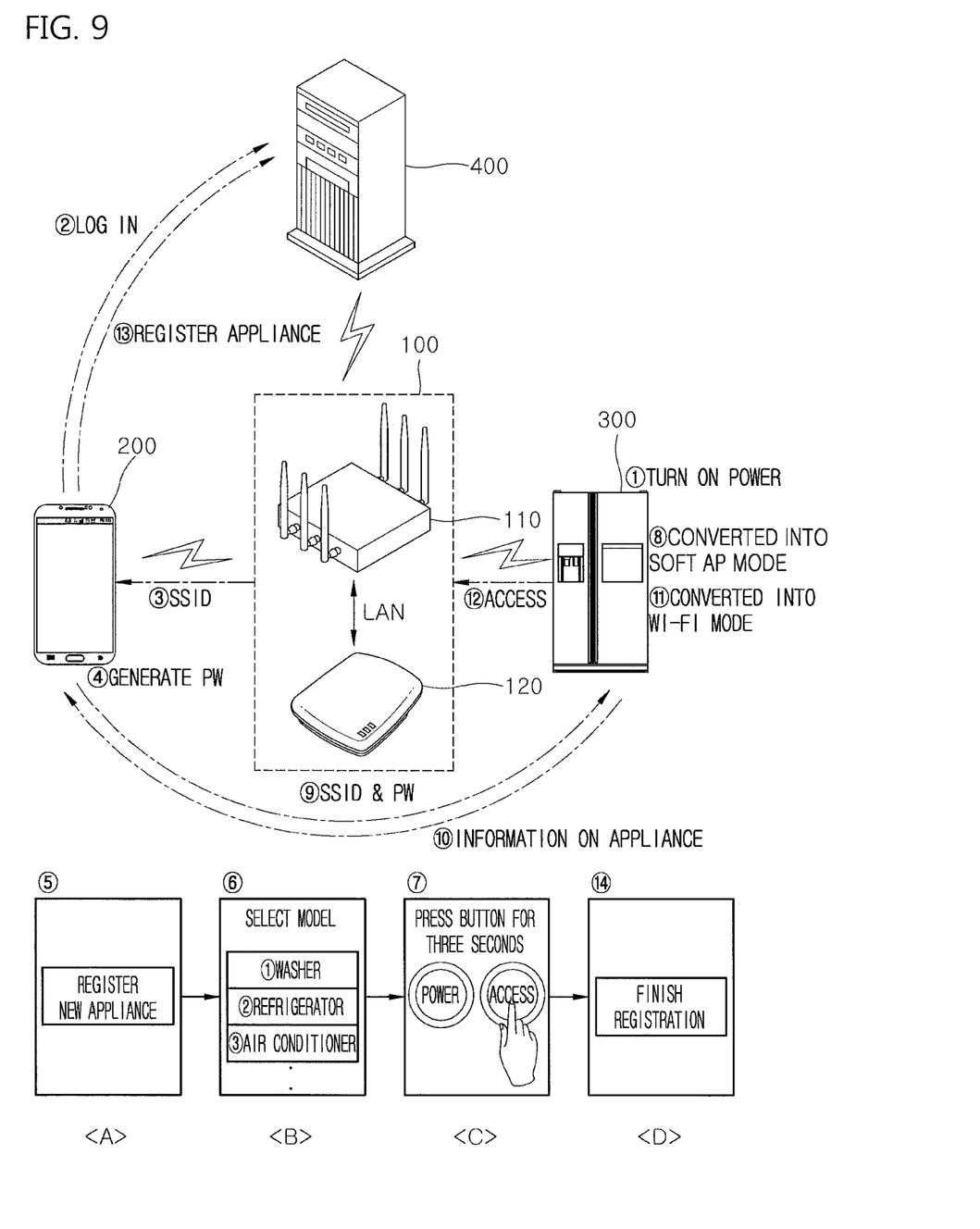
FIG. 9 shows a process of automatic registration of home appliances according to another implementation of the present disclosure.

FIG. 9 shows a process of automatic registration of home appliances according to another implementation of the present disclosure. FIG. 9 is a view simplifying and schematizing the processes in FIGS. 7 and 8 that have been described.

Referring to FIG. 9, in an automatic registration method for home appliances according to another implementation of the present disclosure, a home appliance 300 is turned on (step 1).

Next, the user logs in to the user account of the cloud server 400 through an application of the user terminal 200 (step 2).

Next, the user terminal 200 receives an SSID of the gateway 120 (step 3).

Next, the user terminal 200 selects a decoding algorithm based on the prefix of the received SSID and generates a PW based on the selected decoding algorithm and the suffix of the SSID (step 4).

Next, the user terminal 200 displays on a screen an interface as to whether to "register a new appliance" (step 5).

Next, the user terminal 200 displays on the screen a list of appliances that can be registered when the user selects "registration of a new appliance" (step 6).

Next, when the user selects a specific appliance (e.g., a refrigerator), the user terminal 200 displays a method for converting mode of the appliance (e.g., "Soft-AP mode") on the screen (step 7).

Next, the user converts mode of the home appliance 300 into "Soft-AP mode" (step 8).

Next, the user terminal 200 delivers the SSID and PW of the gateway 120 to the home appliance 300 (step 9).

Next, the user terminal 200 receives from the home appliance 300 information on the appliance, which is needed to register the appliance with the user account (step 10).

Next, the mode of the home appliance 300 is automatically converted from "Soft-AP mode" to "Wi-Fi mode" (step 11).

Next, the home appliance 300 accesses the gateway 120 based on the received SSID and PW (step 12).

Next, the user terminal 200 registers with the user account a home appliance 300 that is not registered with the user account among appliances that are connected to the gateway 120 through the cloud server 400 (step 13).

Next, when the home appliance 300 is normally registered with the user account, the user terminal 200 displays on the screen a massage that says registration is finished (step 14).

However, the present disclosure is not limited to what has been described. In some implementations, some of the above-described steps may be omitted or added.

By doing so, the automatic registration system for home appliances may deliver authentication information of a gateway that connects to a local network to a home appliance that is activated by the user and may prevent the home appliance from connecting to the other's gateway.

Accordingly, the automatic registration system for home appliances may solve the problem that a home appliance automatically connects to an access point of a neighboring house, which uses the same sort of gateway as that of the access point of the user's house. As a result, security and safety related to use of home appliances may be ensured, the risk of personal information leakage may be reduced, and satisfaction of the user may improve.

It should be understood that the above-described implementations are provided only as examples in all aspects and are not limited. The scope of the present disclosure is defined according to the appended claims rather than the above detailed description. Additionally, the meaning and scope of the appended claims as well as all the modifications and modified forms that are drawn from the meaning and scope of the appended claims should be interpreted as being included in the scope of the present disclosure.

DESCRIPTION OF THE SYMBOLS

| 100: LOCAL NETWORK | 110: ACCESS POINT |
|---|---|
| 120: GATEWAY | 200: USER TERMINAL |
| 300: HOME APPLIACNE | 400: CLOUD SERVER |

What is claimed is:

1. An automatic registration system for home appliances, comprising:
   an access point connecting to a cloud server through an external communication network;
   a gateway having a wired connection with the access point;
   a home appliance wirelessly accessing the gateway; and
   a user terminal wirelessly connected to the access point or the gateway and accessing the cloud server through a wireless communications network,
   wherein:
   the user terminal receives information on the home appliance from at least one of the access point or the gateway,
   the user terminal registers the home appliance to the cloud server and with a user account through at least one of the access point or the gateway after the home appliance is confirmed by the user terminal, and
   the home appliance is configured to access the gateway using a password that is generated based on a service set identifier (SSID) of the gateway.

2. The automatic registration system for home appliances of claim 1, wherein:
   the user terminal searches for the gateway and receives the SSID of the gateway,
   generates the password using the received SSID, and
   delivers the SSID of the gateway and the password to the home appliance.

3. The automatic registration system for home appliances of claim 2, wherein the home appliance accesses the gateway using the received SSID and the received password.

4. The automatic registration system for home appliances of claim 2, wherein the SSID includes a prefix that is given to a plurality of gateways and a suffix that represents a unique value for the gateway, and wherein the user terminal generates the password using a decoding algorithm that is stored in advance and on a basis of the suffix.

5. The automatic registration system for home appliances of claim 4, wherein the home appliance searches for the gateway that forms a local network with the access point using the prefix of the SSID.

6. The automatic registration system for home appliances of claim 2, wherein:
a mode of the home appliance is switched to a Soft Access Point (Soft-AP) mode to receive the SSID and password,
the user terminal receives information on the home appliance from the home appliance, and
the information on the home appliance is used to register the home appliance with the user account when the mode of the home appliance is converted into the Soft-AP mode.

7. The automatic registration system for home appliances of claim 6, wherein the user terminal logs into the user account through the cloud server and registers the home appliance with the user account based on the received information.

8. The automatic registration system for home appliances of claim 6, wherein the mode of the home appliance is automatically converted into a Wi-Fi mode such that the home appliance accesses the gateway after transmitting the information on the home appliance in the Soft-AP mode.

9. The automatic registration system for home appliances of claim 1, wherein:
the home appliance searches for the gateway and receives the SSID of the gateway,
generates the password using the received SSID and accesses the gateway using the SSID and password.

10. The automatic registration system for home appliances of claim 9, wherein the SSID includes a prefix that is given to a plurality of gateways and a suffix that represents a unique value of the gateway,
wherein the home appliance generates the password using a decoding algorithm that is stored in advance on a basis of the suffix.

11. The automatic registration system for home appliances of claim 10, wherein the home appliance searches for the gateway that forms a local network with the access point using the prefix of the SSID.

12. The automatic registration system for home appliances of claim 1, wherein the user terminal remotely controls operation of the home appliance through the cloud server when the home appliance is registered with the user account.

13. The automatic registration system for home appliances of claim 1, wherein the home appliance receives the SSID of the gateway and the password based on the home appliance being confirmed by the user terminal.

14. The automatic registration system for home appliances of claim 1, wherein the SSID for the gateway differs from an SSID for the access point.

15. An automatic registration method for home appliances, comprising:
searching for a gateway that has a connection with an access point and receiving a service set identifier (SSID) of the gateway, by at least one home appliance;
generating a password on a basis of the SSID, by the at least one home appliance;
accessing the gateway on a basis of the SSID and the password, by the at least one home appliance;
receiving information on a home appliance, of the at least one home appliance, that is not registered with a user account, by a user terminal; and
registering the unregistered home appliance to a cloud server and with a user account through at least one of the access point or the gateway after the unregistered home appliance is confirmed by the user terminal.

16. The automatic registration method for home appliances of claim 15, further comprising:
remotely controlling operation of the home appliance by the user terminal through the cloud server when the home appliance is registered with the user account.

17. The automatic registration method for home appliances of claim 15, wherein the SSID for the gateway differs from an SSID for the access point.

18. An automatic registration method for home appliances, comprising:
searching for a gateway makes has a wired connection with an access point and receiving a service set identifier (SSID) of the gateway, by a user terminal;
generating a password on a basis of the SSID of the gateway, by the user terminal;
switching an operation mode of a home appliance to a Soft Access Point (Soft-AP) mode, by the user terminal;
transmitting the SSID and password to the home appliance in the Soft-AP mode, by the user terminal;
receiving information on the home appliance from the home appliance by the user terminal, the information being related to registering the home appliance with a user account;
switching the operation mode of the home appliance to a Wi-Fi mode in which the home appliance accesses the gateway using the SSID and password, by the home appliance; and
registering the home appliance a cloud server and with the user account through at least one of the access point or the gateway after the home appliance is confirmed by the user terminal.

19. The automatic registration method for home appliances of claim 18, further comprising:
accessing the user account through the cloud server, by the user terminal;
inputting an instruction to register a new appliance to the user terminal, by a user; and
displaying a Soft-AP mode conversion guide of the home appliance on a screen, by the user terminal.

20. The automatic registration method for home appliances of claim 18, wherein the SSID for the gateway differs from an SSID for the access point.

* * * * *